(12) United States Patent
Chen et al.

(10) Patent No.: US 8,442,568 B2
(45) Date of Patent: May 14, 2013

(54) DETERMINING METHOD FOR USE IN INFORMATION FEEDBACK, BASE STATION, USER EQUIPMENT, AND COMMUNICATIONS SYSTEM

(75) Inventors: Chen Chen, Shanghai (CN); Renmao Liu, Shanghai (CN); Yongming Liang, Shanghai (CN); Ming Ding, Shanghai (CN); Lei Huang, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 387 days.

(21) Appl. No.: 12/989,030

(22) PCT Filed: Apr. 24, 2009

(86) PCT No.: PCT/JP2009/058206
§ 371 (c)(1),
(2), (4) Date: Oct. 21, 2010

(87) PCT Pub. No.: WO2009/131225
PCT Pub. Date: Oct. 29, 2009

(65) Prior Publication Data
US 2011/0034198 A1    Feb. 10, 2011

(30) Foreign Application Priority Data
Apr. 24, 2008 (CN) .......................... 2008 1 0094262

(51) Int. Cl.
*H04Q 7/20* (2006.01)

(52) U.S. Cl.
USPC ........... 455/509; 455/511; 455/513; 455/450; 455/508; 455/515; 370/328; 370/329; 370/343; 370/338; 370/310

(58) Field of Classification Search .................. 455/509, 455/511, 513, 500, 517, 515, 508, 445, 422.1, 455/403, 450, 451, 452.1, 426.1, 426.2; 370/328, 370/329, 343, 338, 310
See application file for complete search history.

(56) References Cited

U.S. PATENT DOCUMENTS 7,764,931 B2 * 7/2010 Kim et al. ........................ 455/69
2006/0268983 A1 11/2006 Kwon et al.

(Continued)

FOREIGN PATENT DOCUMENTS

| JP | 2007-68180 A | 3/2007 |
| JP | 2009-514359 A | 4/2009 |

(Continued)

OTHER PUBLICATIONS

3GPP TS 36.213 V8.2.0 (Mar. 2008), 3GPP, Technical Specification Group Radio Access Network, E-UTRA, Physical layer procedures, (Release 8).

(Continued)

*Primary Examiner* — Keith Ferguson
(74) *Attorney, Agent, or Firm* — Birch, Stewart, Kolasch & Birch, LLP

(57) ABSTRACT

A subband determining method, a base station, user equipment, and a communications system are provided. The base station of the present invention finds the subband size on the basis of a system bandwidth and divides the system bandwidth into subbands. The base station further selects some subbands to form a subband set and assign the subband set to user equipment and notifies the user equipment of information about the subband set. The user equipment in turn finds its corresponding subband size and the number of subbands for use in feedback on the basis of the size of the assigned subband set. The user equipment further divides the subband set into its corresponding subbands on the basis of a result found and feeds back information about a predetermined number of subbands to the base station. The base station carries out optimization of its transmitter on the basis of the information.

9 Claims, 12 Drawing Sheets

U.S. PATENT DOCUMENTS

| | | | |
|---|---|---|---|
| 2007/0098098 A1 | 5/2007 | Xiao et al. | |
| 2007/0115796 A1 | 5/2007 | Jeong et al. | |
| 2007/0230397 A1* | 10/2007 | Sakata | 370/329 |
| 2009/0028260 A1 | 1/2009 | Xiao et al. | |

FOREIGN PATENT DOCUMENTS

| | | |
|---|---|---|
| WO | WO 2006/118434 A1 | 11/2006 |
| WO | WO 2007/053403 A2 | 5/2007 |

OTHER PUBLICATIONS

3GPP TS 36.213V8.8.0 (Sep. 2009), 3GPP, Technical Specification Group Radio Access Network, E-UTRA, Physical layer procedures, (Release 8).

International Search Report, dated May 26, 2009, issued in PCT/JP2009/058206.

Motorola, "Set S for CQI Feedback", 3GPP TSG RAN1#52bis, R1-081312, Shenzhen, China, Mar. 31-Apr. 4, 2008.

NEC Group, "A Proposal for Set S", TSG-RAN WG1 #52 bis, R1-081564, Shenzhen, China, Mar. 31-Apr. 4, 2008.

Panasonic, "Effect of set S on CQI reports", 3GPP TSG-RAN WG1 Meeting #52bis, R1-081202, Shenzhen, China, Mar. 31-Apr. 4, 2008.

Sharp, "Considerations on Set S", 3GPP TSG-RAN WG1#53, R1-081763, Kansas City, Missouri, USA, May 5-9, 2008.

Update of TS36.213 according to changes listed in cover sheet, 3GPP TSG-RAN WG1 Meeting #52, R1-081158, Sorrento, Italy, Feb. 11-15, 2008.

* cited by examiner

SUBBAND SET, $N_{SET\_S}=8$; The frequency range covers the 15th subband through the 22nd subband, and includes 32 resource blocks in total.

SYSTEM BANDWIDTH SIZE, $N_{SYS\_RB}=110$RBs ($N_{SYS\_S}=28$ SUBBANDS, $k=4$RBs)

$2*(\lfloor Log_2 N_{SYS\_S} \rfloor +1) = 2*(\lfloor Log_2 28 \rfloor +1) = 10$bits

INDEX NUMBERS OF COMBINATIONS

| #1 |
| #2 |
| #3 |
| ⋮ |
| #Q |
| ⋮ |
| #(C(N_SYS_S, 2)-1) |
| #C(N_SYS_S, 2) |

INDEX NUMBER OF COMBINATION
CORRESPONDING TO INFORMATION
ABOUT FIRST SUBBAND
IN SUBBAND SET $\lfloor \log_2 C(N_{SYS\_S}, 2) \rfloor + 1 = \lfloor \log_2 C(28, 2) \rfloor + 1 = 9 \text{bits}$ $2*(\lfloor Log_2 N_S \rfloor + 1) = 2*(\lfloor Log_2 28 \rfloor + 1) = 10 bits$

4-BIT BITMAP FORM

INDEX NUMBERS OF COMBINATIONS

| #1 |
| #2 |
| #3 |
| ⋮ |
| #Q |
| ⋮ |
| #(C(N_{SYS\_S}, 2)-1) |
| #C(N_{SYS\_S}, 2) |

INDEX NUMBER OF COMBINATION
CORRESPONDING TO INFORMATION
ABOUT FIRST AND LAST SUBBANDS
IN SUBBAND SET $\lfloor \log_2 C(N_{SYS\_S}, 2) \rfloor + 1 = \lfloor \log_2 C(14, 2) \rfloor + 1 = 7 \text{bits}$

DETERMINING METHOD FOR USE IN INFORMATION FEEDBACK, BASE STATION, USER EQUIPMENT, AND COMMUNICATIONS SYSTEM

TECHNICAL FIELD

The present invention relates to a field of wireless transmission technique. In particular, the present invention relates to a determining method for use in information feedback, base station, user equipment, and communications system, in wireless telecommunications, each of which increases an overall throughput of a system by reducing an amount of feedback information and improving feedback precision in an uplink.

BACKGROUND ART

Along with a rapid and drastic development of wireless telecommunications service, there has been a rapid increase in number of pieces of user equipment (UE) for use in the service. A main challenge for the wireless telecommunications service, however, remains the same, i.e., how to offer a high-speed and high-performance service to as many pieces of user equipment (UE) as possible. Orthogonal frequency division multiplexing (OFDM) technology and multiple-input multiple-output antenna (MIMO) technology are promising techniques for increasing a capacity of a wireless cell. A data throughput of a wireless cell is thus an important indicator for evaluating a quality of service of the wireless cell.

According to IMT-2000 standards as set forth in 3GPP (the 3rd Generation Partner Project), adoption of the MIMO technology is considered because the MIMO technology achieves a high data throughput. According to third-generation mobile communication technology, a base station (eNodeB) is allowed to employ adaptive code modulation technology to change a data transmission rate of a transmitter of the base station on the basis of channel state information (CSI) fed back from user equipment (UE). For Super 3G (S3G) cellular mobile communications system as defined by LTE (Long Term Evolution) Committee, IEEE 802.16 system, and WiMAX wireless LAN system, such a design concept and method are currently extremely popular that a frequency spectrum can be used more efficiently by causing a base station to optimally design a transmitter on the basis of information fed back from user equipment. Further, many companies have announced their plans to improve system performance with use of channel feedback information. However, in a case where an amount of link information fed back from each piece of user equipment is excessively large, a total amount of feedback information constitutes extremely large volumes of data. This further increases a load for wireless transmission in a feedback uplink, reduces efficiency of frequency spectrum use for the uplink, and in a worst-case scenario, may affect a quality of service (QoS) of a wireless cell. The above link information includes, for example, a precoding matrix index (PMI) and channel quality indicator (CQI) of each rank subband in the MIMO technology. An important subject of research for a MIMO system is thus how to reasonably reduce an amount of feedback information. An information feedback method based on a user's selection is a method which achieves a compromise and balance between a feedback load for wireless transmission and MIMO performance. Designing and using a flexible information feedback method is synonymous with an effort to establish the above compromise and balance. A superior information feedback method not only reduces the load for wireless transmission of feedback information, but also causes no decrease, or only an extremely small decrease if any, in efficiency of the MIMO system. As such, it is possible to achieve a gain in information feedback and system efficiency by some highly efficient or suitable feedback methods with use of a propagation path-space characteristic of the channel.

A technology is described in the latest revision of 3GPP TS 36.213, i.e., Proposal R1-081158, also referred to as "36.213 CR0002 (Rel-8, F) Update 36.213", submitted and discussed in the 52nd meeting of 3GPP TSG RAN WG1 held in Sorrento, Italy, from Feb. 11 through 15, 2008. According to the technology, user equipment selects, for each information feedback, (i) the number M of subbands of frequency band for a feedback and (ii) the size of the subbands. The number k of resource blocks (RB) included in each of the subbands is a function of a system bandwidth, i.e., a function of the number of all resource blocks included in the system bandwidth. Since, however, user equipment selects subbands for a feedback from within a range of a single subband set (i.e., a frequency band constituted by a plurality of subbands) assigned by the base station, the above feedback method based on a user's selection is meaningless in a case where the number of subbands included in the subband set assigned by the base station to the user equipment is equal to or smaller than the number M of subbands corresponding to the system bandwidth. Further, in a case where the number of subbands in the subband set assigned by the base station is relatively small, the subband size is excessively large relative to the subband set assigned by the base station to the user equipment. This prevents sufficient use of a frequency selectivity characteristic of a channel in information feedback.

Motorola Inc. of the U.S. submitted a draft proposal (R1-081312) titled "Set S for CQI Feedback" during an electronic mail discussion of 3GPP TSG RAN WG1 on Mar. 22, 2008. The proposal describes a feedback method involving a division of a system bandwidth into bandwidth parts (BPs). Specifically, a subband set is formed from bandwidth parts into which a system bandwidth has been divided in advance, and a logarithm of the number of subbands included in the subband set to the base 2 is found and is then rounded off, so that the value of the logarithm represents the number M of subbands for a feedback for the subband set. This allows the value of M to be dynamically changed on the basis of the number of subbands in a subband set.

CITATION LIST

Non Patent Literature 1
Proposal R1-081158, 52nd meeting of 3GPP TSG RAN WG1, Feb. 11 through 15, 2008
Non Patent Literature 2
Proposal R1-081312, electronic mail discussion of 3GPP TSG RAN WG1, Mar. 22, 2008

SUMMARY OF INVENTION

Technical Problem

The proposal submitted by Motorola Inc., however, (i) requires a complex operation, and (ii) does not allow sufficient use of the frequency selectivity characteristic of a channel because the number of subbands in a subband set assigned to user equipment is unchanged. In view of the circumstances, there is a demand for a simpler and higher performance method for determining the size and number of subbands for use in information feedback. Specifically, by designing a highly efficient and simple information feedback method with use of a characteristic of a channel being expressed in terms of frequency domain, it will be possible to attain an object of improving performance of a wireless cell by reducing a load for wireless transmission of a channel quality indicator in a feedback link, improving efficiency of frequency spectrum use in an uplink, reducing power consumption by user equipment, and dynamically improving feedback precision.

Solution to Problem

It is an object of the present invention to provide (i) a method for determining the size and number of subbands for use in uplink information feedback, (ii) a base station, (iii) user equipment, and (iv) a communications system. Specifically, an object of the present invention is to provide a feedback method by which the size and number of subbands for use in information feedback are dynamically changed by causing user equipment (UE) to (i) obtain, with reference to a table (reference table), its corresponding subband size and the number of subbands for use in information feedback on the basis of the number of resource blocks in a subband set assigned by a base station (eNodeB) and then (ii) feed back information about selected subbands to the base station. This method significantly reduces an amount of feedback information and allows sufficient use of a wireless propagation path selectivity characteristic of a channel, thereby improving system performance.

A first aspect of the present invention provides a subband determining method for use in information feedback, comprising the steps of: (a) causing a first node (a base station) to divide a system bandwidth into a plurality of first subbands; (b) causing the first node to select some of the first subbands to form a subband set, assign the subband set to a second node (a piece of user equipment), and notify the second node of information about the subband set; (c) causing the second node to find a subband size for the second node in accordance with the size of the subband set and divide the subband set into a plurality of second subbands; and (d) causing the second node to select some of the second subbands for use in information feedback and feed back information about the second subbands thus selected to the first node.

According to an embodiment of the present invention, the method may further include the step of: causing the first node to find a size and number of the second subbands, selected by the second node, in accordance with information about the subband set and carry out resource scheduling and optimization of a transmitter in the first node with reference to the information fed back from the second node.

According to the embodiment of the present invention, the method may be arranged such that: in the step (a), the first node further divides the system bandwidth into a plurality of bandwidth parts; and in the step (b), the first node selects at least one of the bandwidth parts to form a subband set, assigns the subband set to the second node, and notifies the second node of information indicative of the at least one of the bandwidth parts.

According to the embodiment of the present invention, the method may be arranged such that in the step (b), in a case where the first subbands in the subband set are located continuously on a frequency spectrum, the first node notifies the second node of either (i) information about the respective subband numbers of initial and last first subbands in the subband set or (ii) information indicative of an initial first subband in the subband set and information indicative of a length of the subband set.

According to the embodiment of the present invention, the method may be arranged such that in the step (b), in a case where the system bandwidth is discontinuous on a frequency spectrum and the first node assigns a separate frequency spectrum region within the system bandwidth to the second node as a subband set, the first node notifies the second node of information indicative of the frequency spectrum region.

According to the embodiment of the present invention, the method may be arranged such that the size of the subband set assigned by the first node is an integral multiple of a least common multiple of subband sizes for various subband sets.

According to the embodiment of the present invention, the method may further include the step of: causing the second node to find a number of bandwidth parts for the second node and divide the subband set into the number of bandwidth parts with the second subbands used as a basis, wherein in the step (d), the second node selects a second subband for use in information feedback from among the second subbands in each of the bandwidth parts.

A second aspect of the present invention provides a base station, including: a subband division unit which divides a system bandwidth into a plurality of first subbands; and a subband set assignment unit which selects some of the first subbands to form a subband set, assign the subband set to a piece of user equipment, and notifies the piece of user equipment of information about the subband set.

The base station may further include a receiver which receives, from the piece of user equipment, feedback information about a second subband selected from among a plurality of second subbands into which the subband set has been divided; and a resource scheduling and transmitter optimization unit which finds a size and number of the second subband, selected by the piece of user equipment, in accordance with information about the subband set and carries out resource scheduling and optimization of a transmitter with reference to the feedback information from the piece of user equipment.

The base station may be arranged such that when the subband division unit divides the system bandwidth into the plurality of first subbands, the subband set assignment unit further divides the system bandwidth into a plurality of bandwidth parts, selects at least one of the bandwidth parts to form a subband set, assigns the subband set to a piece of user equipment, and notifies the piece of user equipment of information indicative of the at least one of the bandwidth parts.

The base station may be arranged such that in a case where the first subbands in the subband set are located continuously on a frequency spectrum, the base station notifies the piece of user equipment of either (i) information about the respective subband numbers of initial and last subbands in the subband set or (ii) information indicative of an initial first subband in the subband set and information indicative of a length of the subband set.

The base station may be arranged such that in a case where the system bandwidth is discontinuous on a frequency spectrum and the subband set assignment unit assigns a separate frequency spectrum region within the system bandwidth to the piece of user equipment as a subband set, the base station directly notifies the piece of user equipment of information indicative of the frequency spectrum region.

The base station may be arranged such that a size of the subband set assigned by the subband set assignment unit is an integral multiple of a least common multiple of subband sizes for various subband sets.

A third aspect of the present invention provides a user equipment, including: a subband re-division unit which, after receiving information, transmitted from a base station, about a subband set including a plurality of first subbands, finds a subband size for the piece of user equipment in accordance with a size of the subband set and divides the subband set into a plurality of second subbands; and a subband information feedback unit which selects a second subband for use in information feedback and feeds back information about the second subband thus selected to the base station.

The user equipment may further be arranged such that the subband re-division unit finds a number of bandwidth parts for the piece of user equipment and divides the subband set into a plurality of bandwidth parts with the second subbands used as a basis; and the subband information feedback unit selects a second subband for use in information feedback from among the second subbands in each of the bandwidth parts.

The present invention further provides a communications system including the base station and the user equipment.

In the embodiment of the present invention, for a size of a system bandwidth, a subband set size and a subband size are expressed in number of resource blocks included in the subband set and a subband, respectively. The present invention is, however, not limited in manner as such.

The following description deals with a preferable embodiment of the present invention with reference to the attached drawings. The description will clarify the above features and advantages of the present invention.

Advantageous Effects of Invention

The above methods and arrangements, which take into consideration the size of a subband set actually assigned to user equipment, make it possible to dynamically change the size and number of subbands for actual use in information feedback on the basis of the size of the subband set actually assigned to the user equipment. This improves quality of service of a wireless cell by sufficiently using a selectivity characteristic of a channel, reducing the amount of feedback information, improving feedback precision, and improving efficiency of frequency spectrum use in an uplink. As a result, it is possible to attain an object of improving performance of an entire system.

DESCRIPTION OF EMBODIMENTS

A specific embodiment of the present invention is described in detail below with reference to the drawings. The following description omits to explain those details irrelevant to methods or systems of the embodiment of the present invention. This omission will prevent confusion over an understanding of the present invention.

Figure 1:
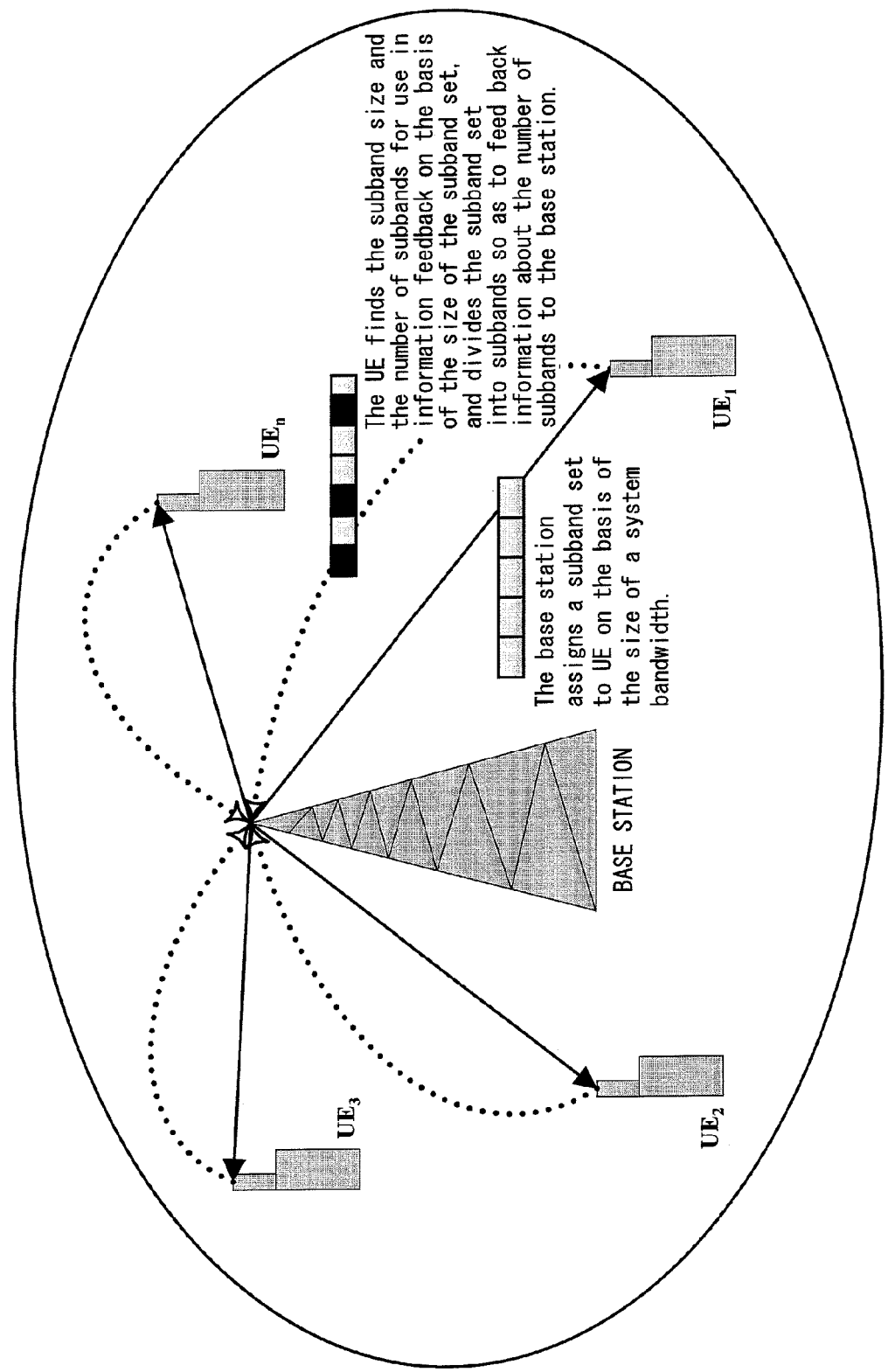
FIG. 1 is a diagram illustrating the principle of a subband determining method used for information feedback within a wireless cell.

FIG. 1 illustrates the principle of how subband information is fed back within a wireless cell. In the embodiment of the present invention, a wireless cell contains a single base station (eNodeB) and plural pieces of user equipment (UE1, UE2, UE3, and UEn). The above information feedback is carried out on the basis of a principle illustrated in FIGS. 2A through 2C.

As illustrated in FIG. 1, the base station divides a system bandwidth into subbands on the basis of the size of the system bandwidth. The base station then selects some of the subbands, into which the system bandwidth has been divided, to form a subband set, assigns the subband set to UE, and notifies the UE of information about the subband set. The information about the subband set includes, for example, information about (i) which subbands have been selected, (ii) where the selected subbands are located within the system bandwidth, and (iii) how large the subband set is in size. The UE then re-divides the subband set into individual subbands on the basis of the size of the subband set, selects an appropriate number of subbands from among the individual subbands so as to feed back information about the subbands thus selected to the base station.

Figure 2A:
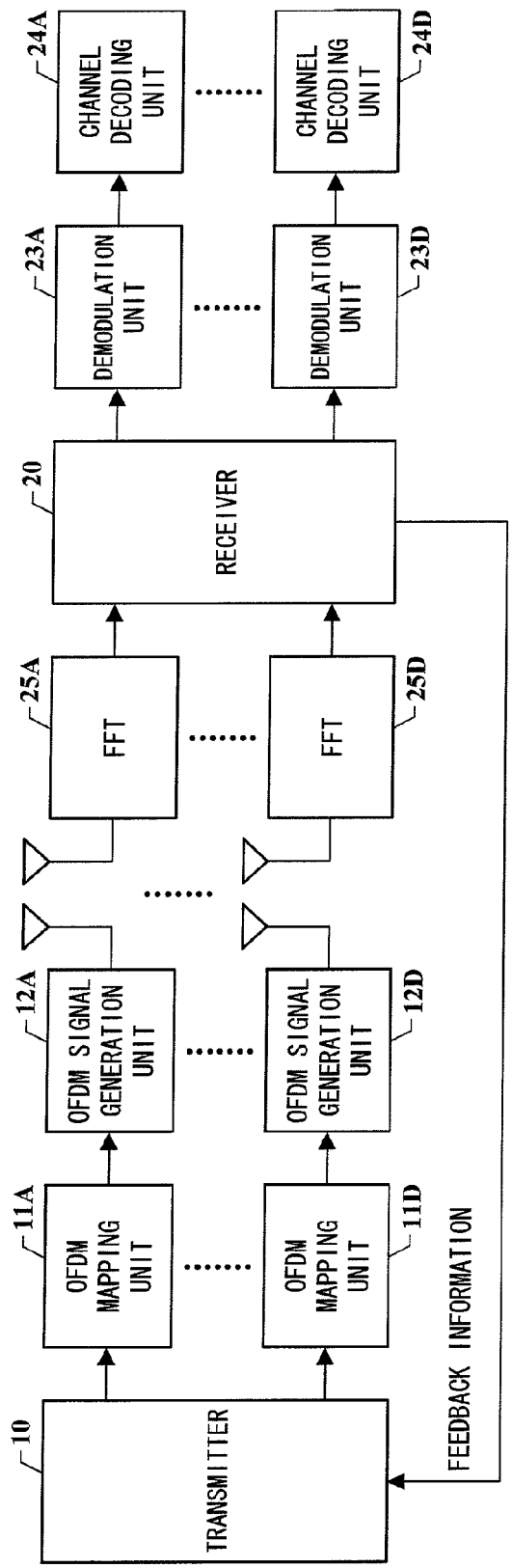
FIG. 2A is a diagram illustrating the principle of how information is fed back.
Figure 2B:
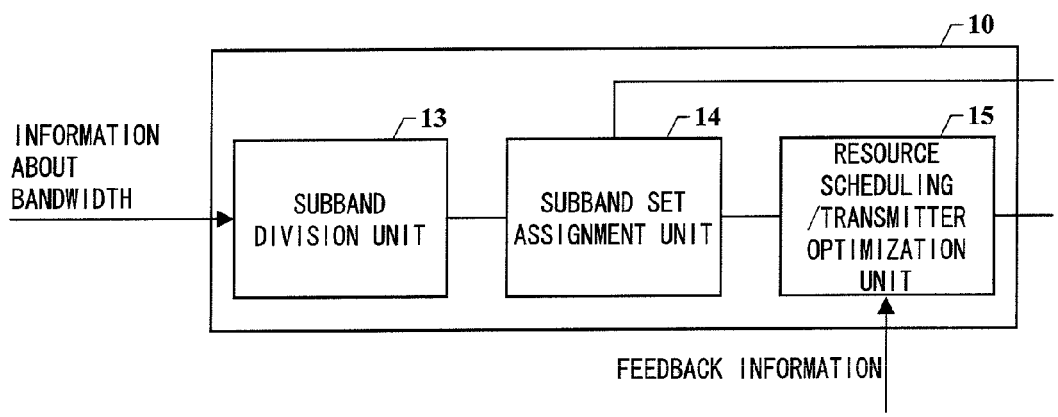
FIG. 2B is a block diagram illustrating a function of a transmitter illustrated in FIG. 2A.

FIG. 2A illustrates the principle of how information is fed back. As illustrated in FIG. 2A, the base station according to the embodiment of the present invention includes: a transmitter 10; OFDM mapping units 11A through 11D; and OFDM signal generation units 12A through 12D, for example. FIG. 2B is a block diagram illustrating a configuration of the transmitter of FIG. 2A. As illustrated in FIG. 2B, the transmitter 10 includes: a subband division unit 13; a subband set assignment unit 14; and a resource scheduling/transmitter optimization unit 15.

Each pieces of user equipment UE according to the embodiment of the present invention includes: FFT units 25A through 25D; a receiver 20; demodulation units 23A through 23D; and channel decoding units 24A through 24D, for example. Information fed back from the receiver 20 includes a CQI, PMI, or rank of each subband to be used in information feedback. A main object of the embodiment of the present invention is to reduce an amount of feedback information and to improve feedback precision.

Figure 2C:
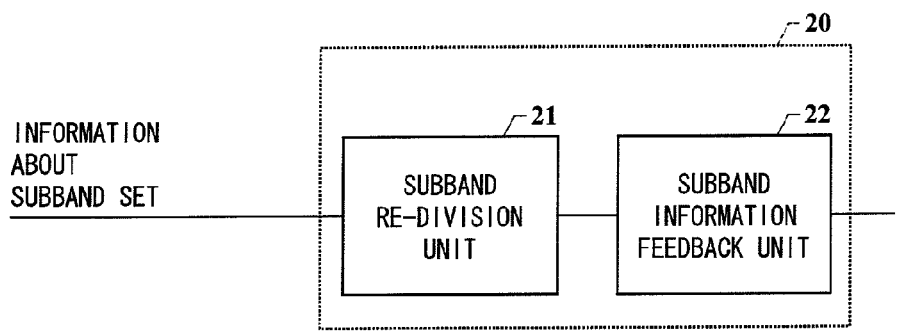
FIG. 2C is a block diagram illustrating a function of a receiver illustrated in FIG. 2A.

FIG. 2C is a block diagram illustrating a configuration of the receiver of FIG. 2A. As illustrated in FIG. 2C, the receiver 20 includes a subband re-division unit 21. The subband re-division unit 21, on the basis of the size of a subband set assigned by the base station, either (i) re-divides the subband set into subbands or (ii) both re-divides the subband set into subbands and finds the number of bandwidth parts so as to divide the subband set into the bandwidth parts. A subband information feedback unit 22 either (i) finds, on the basis of the size of the subband set, the number M of subbands for use in information feedback and selects M subbands so as to feed back information about the M subbands thus selected to the base station, or (ii) selects an appropriate subband from each of the bandwidth parts so as to feed back information about the subbands thus selected to the base station.

Figure 3:
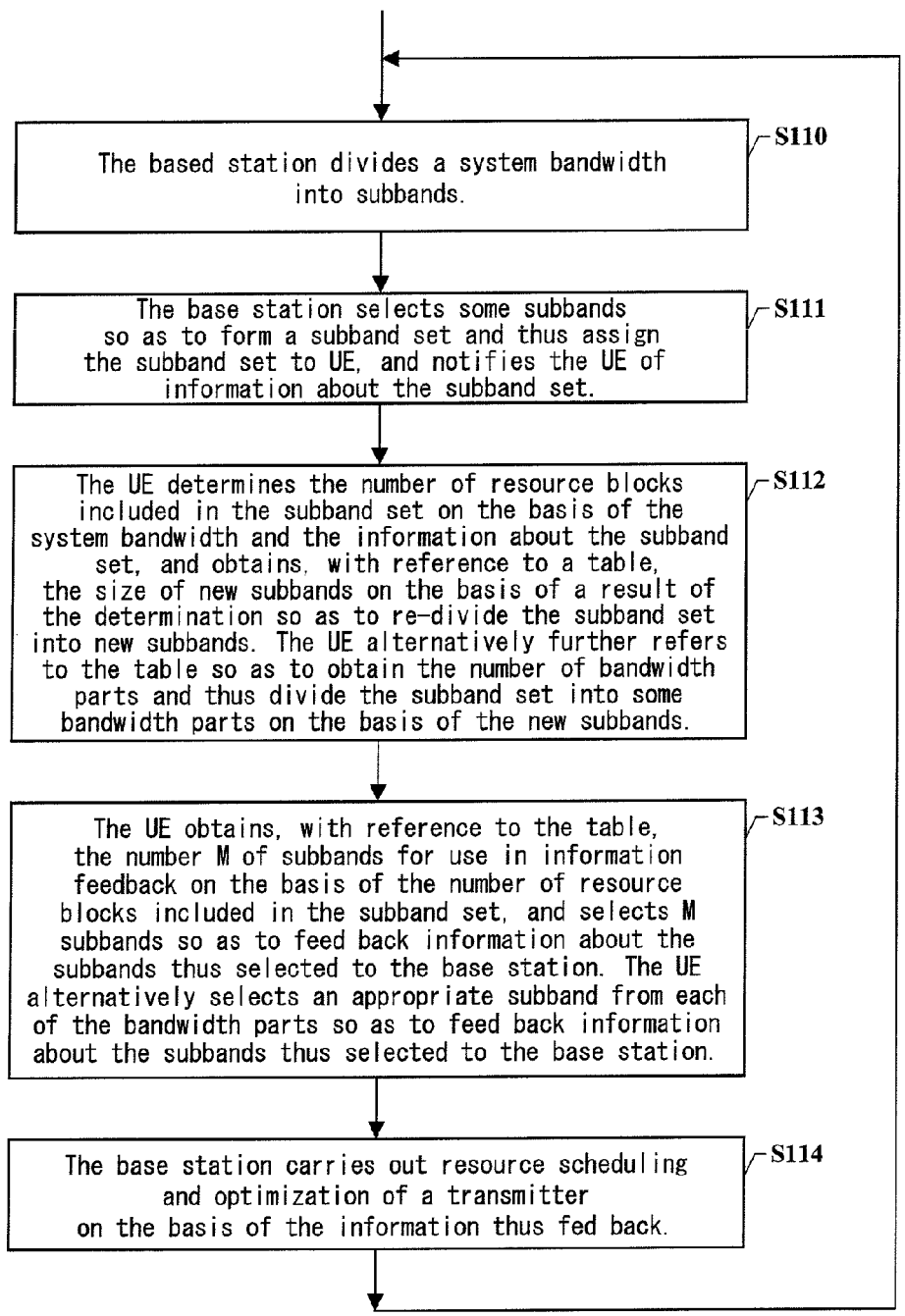
FIG. 3 is a flowchart illustrating a subband determining method used for information feedback in accordance with an embodiment of the present invention.

FIG. 3 is a flow chart illustrating a subband determining method for use in information feedback according to the embodiment of the present invention.

In a step S110, the subband division unit 13 of the base station finds, as described above, a subband size k (i.e., the number of resource blocks included in each subband) on the basis of a system bandwidth size $N_{SYS\_RB}$ (i.e., the number of resource blocks in the system bandwidth) so as to divide the system bandwidth into subbands (see FIG. 3). Resource blocks in each subband are located continuously on a frequency spectrum. In a case where the number $P_{RB}$ of resource blocks in part of the continuous frequency spectrum within the system bandwidth is not an integral multiple of k, the ordinal number i of the last one of the subbands included in the part of the frequency spectrum is the smallest integer among those greater than $P_{RB}/k$. This allows the last subband to include resource blocks whose number is smaller than k.

In a step S111, the subband set assignment unit 14 of the base station selects some subbands so as to form a subband set and thus assign the subband set to UE. The subband set assignment unit 14 further notifies the UE of information about the subband set, such as information about (i) which subbands have been assigned, (ii) where the subbands are located within the system bandwidth, and (iii) how large the subband set is in size.

In a step S112, after the UE receives the information about the subband set assigned by the base station, the subband re-division unit 21 of the UE finds a subband size on the basis of the system bandwidth. The subband re-division unit 21 can find the number $N_{SET\_RB}$ of resource blocks in the subband set on the basis of a result of the above finding in combination with the information about the subband set which information has been notified by the base station. The subband re-division unit 21 then finds a subband size k' for the subband set with use of the number $N_{SET\_RB}$ of resource blocks as a parameter so as to re-divide the subband set into individual subbands. Alternatively, the subband re-division unit 21, with use of the number $N_{SET\_RB}$ of resource blocks as a parameter, (i) finds the subband size k' and (ii) finds the number J of bandwidth parts for the subband set so as to re-divide the subband set both into individual subbands and into bandwidth parts.

In a step S113, the subband information feedback unit 22 of the UE (i) finds the number M of subbands for use in information feedback on the basis of the size of the subband set (i.e., the number of resource blocks in the subband set), and (ii) selects M of subbands from among the individual subbands. The subband information feedback unit 22 then feeds back information about the subbands thus selected to the base station. Alternatively, the subband information feedback unit 22 selects an appropriate subband from each of the bandwidth parts so as to feed back information about the subbands thus selected to the base station.

In a step S114, the resource scheduling/transmitter optimization unit 15 of the base station, on the basis of the information about the subband set assigned to the UE, finds (i) the subband size and (ii) either the number of the subbands or the number of the bandwidth parts indicated by the information fed back from the UE, by a method which has been agreed upon with the UE in advance and which is thus common to the base station and the UE. The resource scheduling/transmitter optimization unit 15 then carries out resource scheduling and optimization of the transmitter 10 on the basis of the information fed back from the UE. The process then starts a next cycle.

Application Example 1

(1) Configuration of a Wireless Cell

As illustrated in FIG. 1, a wireless cell includes a single base station (eNodeB) and plural pieces of user equipment (UE). FIGS. 2A through 2C illustrate the principle of how information is fed back within the wireless cell.

(2) The subband division unit 13 of the base station obtains a subband size k (i.e., the number of resource blocks included in each subband) from Table 1, stored in a memory device (not shown) of the base station, on the basis of a system bandwidth size $N_{SYS\_RB}$ (i.e., the number of resource blocks included in the system bandwidth). Refer to Table 1 below for a specific method of how the base station divides the system bandwidth into subbands. In Table 1, the size is expressed as the number of resource blocks ($RB_S$).

TABLE 1

| SYSTEM BANDWIDTH SIZE $N_{SYS\_RB}(RB_S)$ | SUBBAND SIZE $k(RB_S)$ |
|---|---|
| 6-7 | BROADBAND ONLY |
| 8-10 | 2 |
| 11-26 | 2 |
| 27-63 | 3 |
| 64-110 | 4 |

Resource blocks in each subband are located continuously on a frequency spectrum. In a case where a number $P_{RB}$ of resource blocks included in a continuous frequency spectrum part within the system bandwidth is not an integral multiple of k, the ordinal number $N_{SYS\_S}$ of the last one of subbands included in the frequency spectrum part is a smallest one of integers greater than $P_{RB}/k$. This allows the last subband to include resource blocks fewer than k.

Figure 4:
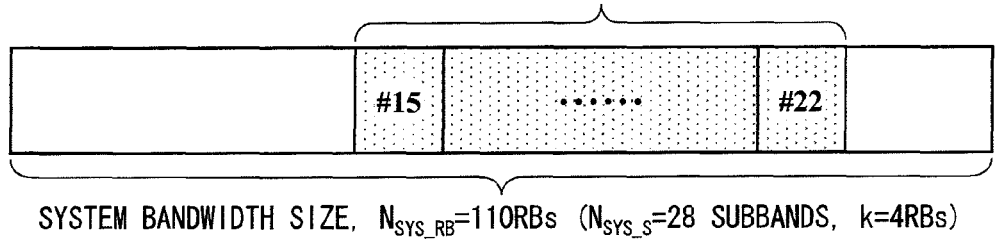
FIG. 4 is a diagram schematically illustrating how a base station assigns a part of a system bandwidth.

(3) The subband set assignment unit 14 of the base station selects some subbands so as to form a subband set and thus assign the subband set to UE. In a case where, for example, the system bandwidth size corresponds to 110 resource blocks, k is 4. The subband set formed from the selected subbands includes $N_{SET\_S}=8$ subbands, and the individual subbands in the subband set are located continuously on a frequency spectrum. The subband set formed from the subbands #15 through #22 includes a total of 32 resource blocks. FIG. 4 is a view schematically illustrating this case. The base station notifies the UE of information about the respective subband numbers (index numbers; e.g., #15 and #22) of the first and last subbands in the subband set within the system bandwidth. The notification is carried out by a method of directly notifying the base station of the respective subband numbers of the first and last subbands in the subband set within the system bandwidth. A combination of the first and last subband numbers is indicated with, for example, 10-bit data (see FIG. 5). Alternatively, the base station can notify the UE of the index number of a combination in accordance with a method based on the number of combinations. Specifically, assuming that the system bandwidth includes a total of $N_{SYS\_S}$ subbands, the index number of a combination for a number #Q falls within a range from 1 to $C(N_{SYS\_S}, 2)$. C(a, b) is a symbol that indicates the total number of possible combinations of b constituents selected from a members. The index number of a combination is expressed as 9-bit data (see FIG. 6). The UE can identify, on the basis of the index number of a combination, respective locations of the first and last subbands in the subband set assigned to the UE.

Further, the base station can alternatively notify the UE of information about the subband set by a method of notifying (i) the subband number of the first subband in the subband set within the system bandwidth and (ii) the length of the subband set (i.e., the number of subbands included in the subband set). Such information can be expressed, for example, as 10-bit data (see FIG. 7).

(4) After receiving the information about the subband set assigned by the base station, the UE obtains (i) a subband size k' for the subband set and (ii) the number M of subbands for use in information feedback from Table 2, stored in the memory device (not shown) of the UE, on the basis of a subband set size $N_{SET\_RB}$ (i.e., the number of resource blocks included in the subband set). Refer to Table 2 below for a specific method of how the UE obtains the subband size k' and the number M. Since the subband set assigned to the UE includes 32 resource blocks in the present embodiment, the corresponding subband size k' is 3 according to Table 2. The UE further selects M=5 subbands (re-division subbands) and feeds back information about the subbands thus selected to the base station.

TABLE 2

| SUBBAND SET SIZE $N_{SET\_RB}(RB_S)$ | SUBBAND SET SIZE $k'(RB_S)$ | NUMBER M OF SUBBANDS FOR FEEDBACK |
|---|---|---|
| 6-7 | BROADBAND ONLY | BROADBAND ONLY |
| 8-10 | 2 | 1 |
| 11-26 | 2 | 3 |
| 27-63 | 3 | 5 |
| 64-110 | 4 | 6 |

Figure 8:
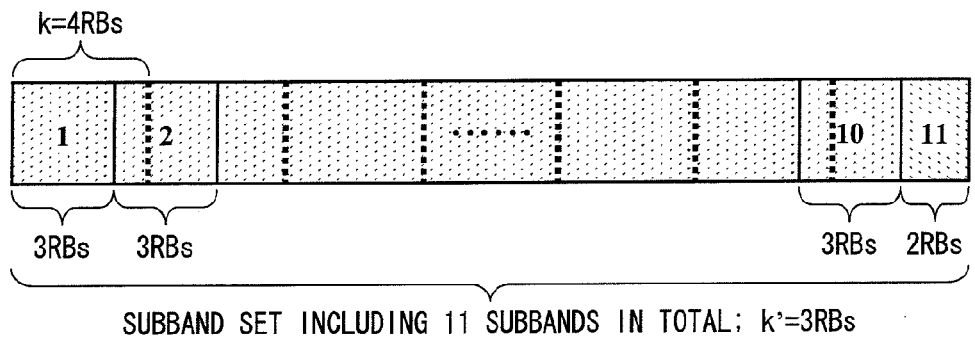
FIG. 8 is a diagram schematically illustrating how UE re-divides a subband set into subbands on the basis of the size of the subband set.

(5) The subband re-division unit 21 of the UE re-divides the subband set into individual subbands on the basis of, for example, k'. According to an example illustrated in FIG. 8, the subband set is divided into 11 subbands. Resource blocks in each subband are located continuously on a frequency spectrum, and the individual subbands are sequentially located continuously on a frequency spectrum. In a case where a number $P_{RB}'$ of resource blocks included in the subband set is not an integral multiple of k', the ordinal number i' of the last one of subbands included in a frequency spectrum part which corresponds to the subband set is a smallest one of integers greater than $P_{RB}'/k'$. This allows the last subband to include resource blocks fewer than k'. The subband information feedback unit 22 of the UE (i) selects M=5 subbands which are good in downlink wireless propagation path property and then (ii) feeds back information about, for example, a rank, PMI, and CQI of each of the 5 subbands thus selected to the base station.

(6) The resource scheduling/transmitter optimization unit 15 of the base station carries out resource scheduling and optimization of a transmitter on the basis of the information thus fed back.

The resource scheduling/transmitter optimization unit 15 of the base station obtains, on the basis of the feedback information for the subband set assigned to the UE, (i) the size of the subbands whose information has been fed back from the UE and (ii) the number of the subbands, by a method which has been agreed upon with the UE in advance and which is thus common to the base station and the UE. The size and the number are obtained, for example, as indicated in Table 2, stored in the memory device (not shown) of the base station. The resource scheduling/transmitter optimization unit 15 then carries out resource scheduling and optimization of the transmitter on the basis of the information fed back from the UE.

(7) Steps (1) through (6) are repeatedly carried out.

It is thus possible to maintain a smooth communication between the base station and each piece of UE in the wireless cell by repeatedly carrying out the steps (1) through (6) as illustrated in FIG. 3.

Application Example 2

(1) Configuration of a Wireless Cell

As illustrated in FIG. 1, a wireless cell includes a single base station (eNodeB) and plural pieces of user equipment (UE). FIGS. 2A through 2C illustrate the principle of how information is fed back within the wireless cell.

(2) The subband division unit 14 of the base station obtains a subband size k (i.e., the number of resource blocks included in each subband) from Table 1, stored in a memory device (not shown) of the base station, on the basis of a system bandwidth size $N_{SYS\_RB}$ (i.e., the number of resource blocks included in the system bandwidth). Refer to Table 1 below for a specific method of how the base station divides the system bandwidth into subbands.

Resource blocks in each subband are located continuously on a frequency spectrum, and the individual subbands are sequentially located continuously on a frequency spectrum. In a case where a number $P_{RB}$ of resource blocks included in a continuous frequency spectrum part within the system bandwidth is not an integral multiple of k, the last subband within the continuous frequency spectrum part is set to an i-th subband (where i is either an integer equal to $P_{RB}/k$ or a smallest one of integers greater than $P_{RB}/k$). This allows the last subband to include resource blocks fewer than k.

Figure 5:
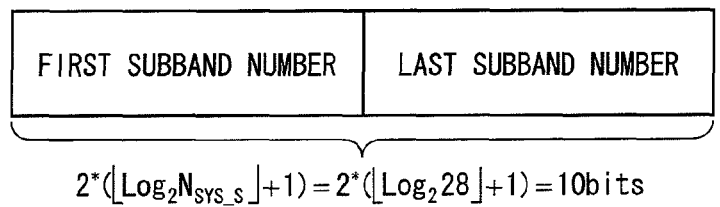
FIG. 5 is a diagram schematically illustrating how the base station directly notifies UE of the respective subband numbers of the first and last subbands in a subband set.
Figure 6:
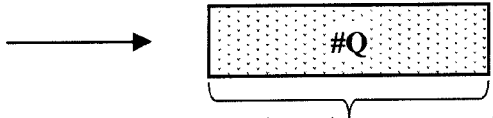
FIG. 6 is a diagram schematically illustrating how the base station notifies UE of information about the respective subband numbers of the first and last subbands in a subband set by a method using a number of combinations.
Figure 9:
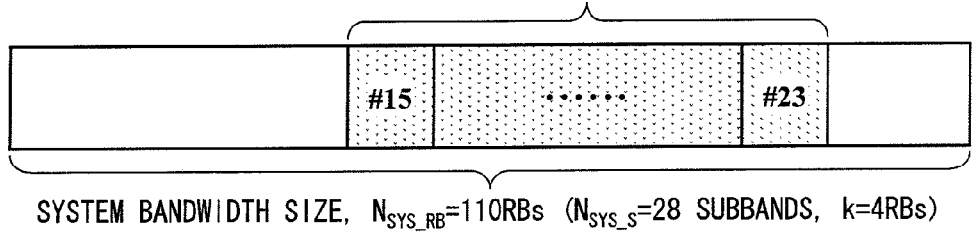
FIG. 9 is a diagram schematically illustrating how the base station assigns a subband set having a size which is an integral multiple of the least common multiple of subband sizes for various subband set sizes.

(3) The subband set assignment unit 14 of the base station selects some subbands so as to form a subband set. The individual subbands in the subband set are located continuously on a frequency spectrum. In a case where the subband set includes no subband whose number of resource blocks is fewer than k, the subband set assignment unit 14 can form a subband set so that the size of the subband set, i.e., the number of resource blocks included in the subband set, is an integral multiple of the least common multiple of subband sizes k' for various subband sets. This guarantees that even after the UE readjusts the subband size, the number of resource blocks included in a current subband set remains an integral multiple of the subband size. This prevents a subband whose size is smaller than k' from being present. As illustrated in FIG. 9, the subband assignment unit 14 of the base station selects $N_{SET\_S}$=9 subbands so as to form a subband set and thus assign the subband set to UE. The subband set includes 36 resource blocks. The base station notifies the UE of information about the subband set, such as information about (i) which subbands have been assigned, (ii) where the subbands are located within the system bandwidth, and (iii) how large the subband set is in size. It is assumed here that the system bandwidth includes 110 resource blocks (see FIG. 4). The base station notifies the UE of information about the respective subband numbers, within the system bandwidth, of the first and last subbands in the subband set. The notification can be carried out by a method of directly notifying the respective subband numbers, within the system bandwidth, of the first and last subbands in the subband set. An example is illustrated in FIG. 5. Alternatively, the base station can notify the UE of the index number of a combination in accordance with a method based on the number of combinations. Specifically, assuming that the system bandwidth includes a total of $N_{SYS\_S}$ subbands, the index number of a combination falls within a range from 1 to $C(N_{SYS\_S}, 2)$, e.g., #Q. An example is illustrated in FIG. 6. The UE identifies, on the basis of the index number of a combination, the respective locations of the first and last subbands in the subband set assigned to the UE.

Figure 7:
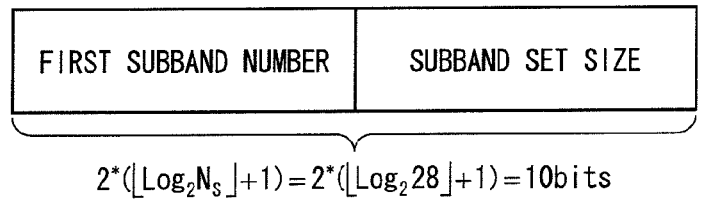
FIG. 7 is a diagram schematically illustrating how the base station notifies UE of information about a subband set by a method of notifying information about (i) the first subband in the subband set and (ii) the length of the subband set.

Alternatively, the base station notifies the UE of information about the subband set by notifying (i) the subband number, within the system bandwidth, of the first subband in the subband set and (ii) a length of the subband set (i.e., a number of subbands included in the subband set). An example is illustrated in FIG. 7.

(4) After receiving the information about the subband set assigned by the base station, the UE finds (i) a subband size k' for the subband set and (ii) a number M of subbands for use in information feedback on the basis of a subband set size $N_{SET\_RB}$ (i.e., a number of resource blocks included in the subband set). Refer to Table 2, stored in a memory device (not shown) of the UE, for a specific method of how the UE finds the subband size k' and the number M.

Figure 10:
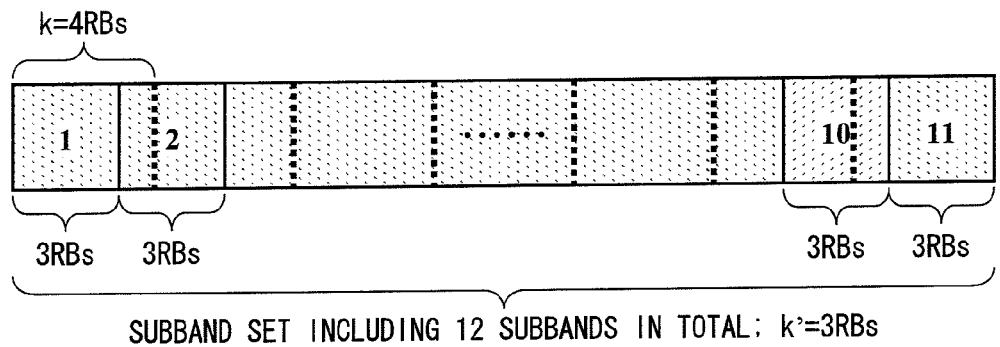
FIG. 10 is a diagram schematically illustrating how UE re-divides a subband set into subbands on the basis of the size of the subband set in a case where the size of the subband set is an integral multiple of the least common multiple of subband sizes for various subband set sizes.

(5) The subband re-division unit 21 of the UE re-divides the subband set into individual subbands on the basis of k'. As illustrated in FIG. 10, the subband set is divided into 12 subbands. Resource blocks in each subband are located continuously on a frequency spectrum. The individual subbands are located continuously on a frequency spectrum in order of their respective numbers. The subband information feedback unit 22 of the UE selects M=5 subbands from the individual subbands so as to feed back information about, for example, a rank, PMI, and CQI of each of the 5 subbands thus selected to the base station.

(6) The resource scheduling/transmitter optimization unit 15 of the base station carries out resource scheduling and optimization of a transmitter on the basis of the information thus fed back.

The resource scheduling/transmitter optimization unit 15 of the base station obtains, on the basis of the feedback information for the subband set assigned to the UE, (i) a size of the subbands whose information has been fed back from the UE and (ii) a number of the subbands, by a method which has been agreed upon with the UE in advance and which is thus common to the base station and the UE. The size and the number are obtained, for example, as indicated in Table 2, stored in the memory device (not shown) of the base station. The resource scheduling/transmitter optimization unit 15 then carries out resource scheduling and optimization of the transmitter on the basis of the information fed back from the UE.

(7) Steps (1) through (6) are repeatedly carried out.

It is thus possible to maintain a smooth communication between the base station and each UE in the wireless cell by repeatedly carrying out the steps (1) through (6) as illustrated in FIG. 3.

Application Example 3

(1) Configuration of a Wireless Cell

As illustrated in FIG. 1, a wireless cell includes a single base station (eNodeB) and plural pieces of UE. FIGS. 2A through 2C illustrate the principle of how information is fed back within the wireless cell.

(2) The subband division unit 14 of the base station finds a subband size k (i.e., a number of resource blocks included in each subband) on the basis of a system bandwidth size $N_{SYS\_RB}$ (i.e., a number of resource blocks included in the system bandwidth). Refer to Table 1, stored in a memory device (not shown) of the base station, for a specific method of how the base station divides the system bandwidth into subbands.

Resource blocks in each subband are located continuously on a frequency spectrum, and the individual subbands are located continuously on a frequency spectrum in order of their respective numbers. In a case where a number $P_{RB}$ of resource blocks included in a continuous frequency spectrum part within the system bandwidth is not an integral multiple of k, the last subband within the continuous frequency spectrum part is set to an i-th subband (where i is either an integer equal to $P_{RB}/k$ or a smallest one of integers greater than $P_{RB}/k$). This allows the last subband to include resource blocks fewer than k.

(3) The subband set assignment unit 14 of the base station selects some subbands so as to form a subband set. In a case where, for example, the system bandwidth is discontinuous on a frequency spectrum, the system bandwidth includes an L-number of separate continuous spectrum parts (see FIG.

11), and the base station assigns part of the separate frequency spectrum to UE as a subband set for each subband set assignment. The base station notifies the UE of information about the subband set, such as information about (i) which subbands have been assigned, (ii) where the subbands are located within the system bandwidth, and (iii) how large the subband set is in size. The notification can be carried out by a method of directly notifying the respective subband numbers, within the system bandwidth, of first and last subbands in the subband set. An example is illustrated in each of FIGS. 5 and 6. The base station can identify respective locations of the first and last subbands in the subband set on the basis of information about the subband numbers. Alternatively, the base station notifies the UE of information about the subband set by notifying (i) the subband number, within the system bandwidth, of the first subband in the subband set and (ii) a length of the subband set (i.e., a number of subbands included in the subband set). An example is illustrated in FIG. 7.

Figure 12:
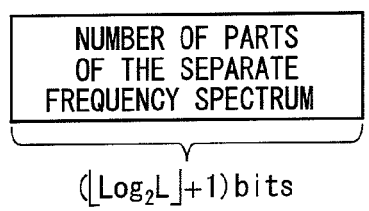
FIG. 12 is a diagram schematically illustrating how the base station notifies UE of the number of separate continuous spectrums in a case where the system bandwidth is discontinuous on a frequency spectrum.

According to the present application example, in a case where the base station assigns a separate continuous spectrum part within the system bandwidth to UE as a subband set, the base station can notify the UE of information about the subband set by directly notifying the UE of the number of the part of the separate frequency spectrum. The UE obtains information about the assigned subband set by receiving information about the number of the part of the separate frequency spectrum. The number can be expressed as data having the number of bits as obtained by adding 1 to the integer part of $\log_2 L$ (see FIG. 12).

(4) After receiving the information about the subband set assigned by the base station, the UE finds (i) a subband size k' for the subband set and (ii) a number M of subbands for use in information feedback on the basis of a subband set size $N_{SET\_RB}$ (i.e., a number of resource blocks included in the subband set). Refer to Table 2, stored in a memory device (not shown) of the UE, for a specific method of how the UE finds the subband size k' and the number M.

(5) The subband re-division unit 21 of the UE re-divides the subband set into individual subbands on the basis of k'. Resource blocks in each subband are located continuously on a frequency spectrum. The individual subbands are located continuously on a frequency spectrum in order of their respective numbers. In a case where a number $P_{RE}'$ of resource blocks included in the subband set is not an integral multiple of k', the last subband within the frequency spectrum part is set to the i'-th subband (where i' is either an integer equal to $P_{RB}'/k'$ or a smallest one of integers greater than $P_{RB}'/k'$). This allows the last subband to include resource blocks fewer than k'. The UE selects an M-number of subbands, and the subband information feedback unit 22 then feeds back information about, for example, a rank, PMI, and CQI of each of the subbands thus selected to the base station.

(6) The resource scheduling/transmitter optimization unit 15 of the base station carries out resource scheduling and optimization of a transmitter on the basis of the information thus fed back.

The resource scheduling/transmitter optimization unit 15 of the base station finds, on the basis of the feedback information about the size of the subband set (i.e., a number of resource blocks included in the subband set) assigned to the UE, (i) the size of the subbands whose information has been fed back from the UE and (ii) a number of the subbands, by a method which has been agreed upon with the UE in advance and which is thus common to the base station and the UE. The size and the number are obtained, for example, as indicated in Table 2, stored in the memory device (not shown) of the base station.

The resource scheduling/transmitter optimization unit 15 then carries out resource scheduling and optimization of a transmitter on the basis of the information fed back from the UE about the selected subbands and information about the entire bandwidth.

(7) Steps (1) through (6) are repeatedly carried out.

It is thus possible to maintain a smooth communication between the base station and each UE in the wireless cell by repeatedly carrying out the steps (1) through (6) as illustrated in FIG. 3.

Application Example 4

(1) Configuration of a Wireless Cell

A configuration of a wireless cell is illustrated in FIG. 1. Specifically, a wireless cell includes a single base station (eNodeB) and plural pieces of user equipment (UE). The individual UE employ MIMO schemes different from one another. Specifically, the UE1 can employ a SU-MIMO scheme, the UE2 can employ a MU-MIMO scheme, the UE3 can employ a CL (closed loop)-MIMO scheme, and the UEn can employ an OL (open loop)-MIMO scheme. FIG. 2 illustrates the principle of how information is fed back in a MIMO scheme.

(2) A system bandwidth is continuous on a frequency spectrum. The subband division unit 14 of the base station divides the system bandwidth into subbands on the basis of a system bandwidth size $N_{SYS\_RB}$ (i.e., the number of resource blocks included in the system bandwidth). Refer to Table 3 below, stored in a memory device (not shown) of the base station, for a specific method of how the subband division unit 14 divides the system bandwidth into subbands.

Figure 13:
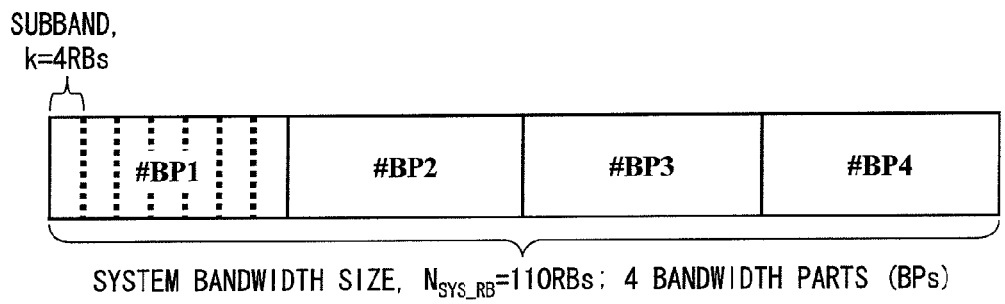
FIG. 13 is a diagram schematically illustrating how the base station divides the entire bandwidth into bandwidth parts on the basis of the system bandwidth.

The base station further divides the entire bandwidth into some bandwidth parts, e.g., #BP1 through #BP4, simultaneously with the division of the system bandwidth into subbands (see FIG. 13). Refer to Table 3 below for a specific method of how the base station divides the entire bandwidth into bandwidth parts.

TABLE 3

| SYSTEM BANDWIDTH SIZE $N_{SYS\_RB}(RB_S)$ | SUBBAND SIZE $k(RB_S)$ | NUMBER J OF BANDWIDTH PARTS |
| --- | --- | --- |
| 6-7 | BROADBAND ONLY | BROADBAND ONLY |
| 8-10 | 2 | 1 |
| 11-26 | 2 | 2 |
| 27-63 | 3 | 3 |
| 64-110 | 4 | 4 |

Resource blocks in each subband are located continuously on a frequency spectrum. In a case where a number $P_{RB}$ of resource blocks included in the system bandwidth is not an integral multiple of k, the last subband within the frequency spectrum part is set to an i-th subband (where i is either an integer equal to $P_{RB}/k$ or a smallest one of integers greater than $P_{RB}/k$). This allows the last subband to include resource blocks fewer than k.

Figure 14:
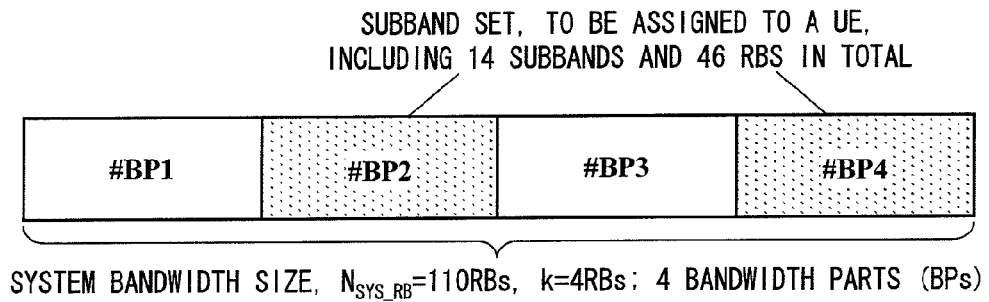
FIG. 14 is a diagram schematically illustrating how the base station selects some bandwidth parts so as to assign the bandwidth parts to UE as a subband set.
Figure 15:
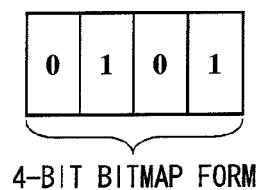
FIG. 15 is a diagram schematically illustrating how the base station notifies UE of information about the selected bandwidth parts in the form of a bitmap.

(3) The subband set assignment unit 14 of the base station selects a bandwidth part so as to form a subband set and thus assign the subband set to UE. Assuming that the system bandwidth includes 110 resource blocks, the subband set assignment unit 14 assigns to UE a subband set formed from the bandwidth parts #BP2 and #BP4 resulting from the above division (see FIG. 14). The base station notifies the UE of information about the subband set, such as information about (i) which subbands have been assigned, (ii) where the subbands are located within the system bandwidth, and (iii) how large the subband set is in size. The base station notifies the UE of the information about the selected bandwidth parts in a form of, for example, a bitmap. The bitmap contains the number of bits (i.e., the amount of information) which number is equal to the total number of bandwidth parts included in the entire bandwidth. Each of the bits indicates whether a corresponding bandwidth part is included in the subband set (see FIG. 15).

(4) After receiving the information about the subband set assigned by the base station, the UE obtains (i) a subband size k' for the subband set and (ii) a number M of subbands for use in information feedback on the basis of a subband set size $N_{SET\_RB}$ (i.e., a number of resource blocks included in the subband set). Refer to Table 4 below, stored in a memory device (not shown) of the UE, for a specific method of how the UE finds the subband size k' and the number M.

TABLE 4

| SUBBAND SET SIZE $N_{SET\_RB}(RB_S)$ | SUBBAND SET SIZE k'($RB_S$) | NUMBER M OF SUBBANDS FOR FEEDBACK |
|---|---|---|
| 6-7 | BROADBAND ONLY | BROADBAND ONLY |
| 8-10 | 2 | 1 |
| 11-26 | 2 | 3 |
| 27-63 | 3 | 5 |
| 64-110 | 4 | 6 |

Figure 16:
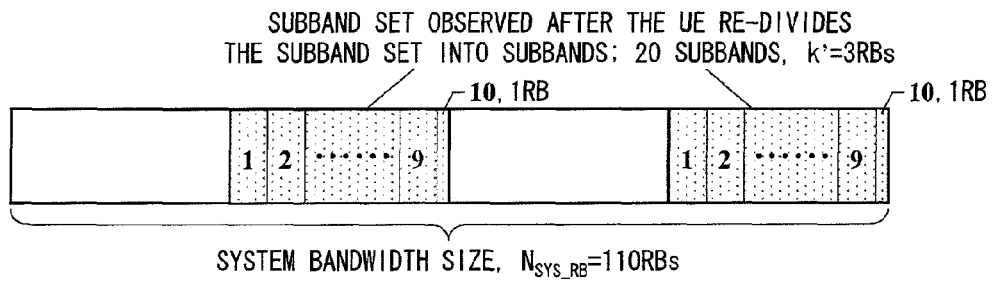
FIG. 16 is a diagram schematically illustrating how the UE re-divides the subband set, formed from the bandwidth parts and assigned to the UE, into subbands.

(5) The subband re-division unit 21 of the UE re-divides the subband set into individual subbands on the basis of k'. The subband set is divided into 20 subbands (see FIG. 16). Resource blocks in each subband are located continuously on a frequency spectrum. In a case where a number $P_{RB}'$ of resource blocks included in a separate frequency range within the subband set is not an integral multiple of k', the last subband within the separate frequency range is set to an i'-th subband (where i' is either an integer equal to $P_{RB}'/k'$ or a smallest one of integers greater than $P_{RB}'/k'$). This allows the last subband to include resource blocks fewer than k', e.g., a single resource block. The subband information feedback unit of the UE feeds back information about, for example, a rank, PMI, and CQI of each of M=5 selected subbands to the base station.

(6) The resource scheduling/transmitter optimization unit 15 of the base station carries out resource scheduling and optimization of a transmitter on the basis of the information thus fed back.

The resource scheduling/transmitter optimization unit 15 of the base station obtains, on the basis of the feedback information for the subband set assigned to the UE, (i) the size of the subbands whose information has been fed back from the UE and (ii) a number of the subbands, by a method which has been agreed upon with the UE in advance and which is thus common to the base station and the UE. The size and the number are obtained, for example, as indicated in Table 4, stored in the memory device (not shown) of the base station. The resource scheduling/transmitter optimization unit 15 then carries out resource scheduling and optimization of the transmitter on the basis of the information fed back from the UE.

(7) Steps (1) through (6) are repeatedly carried out.

It is thus possible to maintain a smooth communication between the base station and each UE in the wireless cell by repeatedly carrying out the steps (1) through (6) as illustrated in FIG. 3.

Application Example 5

(1) Configuration of a Wireless Cell

As illustrated in FIG. 1, a wireless cell includes a single base station (eNodeB) and plural pieces of user equipment (UE). FIGS. 2A through 2C illustrate the principle of how information is fed back within the wireless cell.

(2) The subband division unit 14 of the base station obtains, with reference to Table 5 stored in a memory device (not shown) of the base station, a subband size k (i.e., a number of resource blocks included in each subband) on the basis of a system bandwidth size $N_{SYS\_RB}$ (i.e., a number of resource blocks included in the system bandwidth). Refer to table 5 for a specific method of how the base station divides the system bandwidth into subbands.

TABLE 5

| SYSTEM BANDWIDTH SIZE $N_{SYS\_RB}(RB_S)$ | SUBBAND SIZE k($RB_S$) |
|---|---|
| 6-7 | BROADBAND ONLY |
| 8-10 | 4 |
| 11-26 | 4 |
| 27-63 | 6 |
| 64-110 | 8 |

Resource blocks in each subband are located continuously on a frequency spectrum. In a case where a number $P_{RB}$ of resource blocks included in a continuous frequency spectrum part within the system bandwidth is not an integral multiple of k, the last subband within the continuous frequency spectrum part is set to the $N_{SYS\_S}$-th subbands (where $N_{SYS\_S}$ is either an integer equal to $P_{RB}/k$ or a smallest one of integers greater than $P_{RB}/k$). This allows the last subband to include resource blocks fewer than k.

Figure 17:
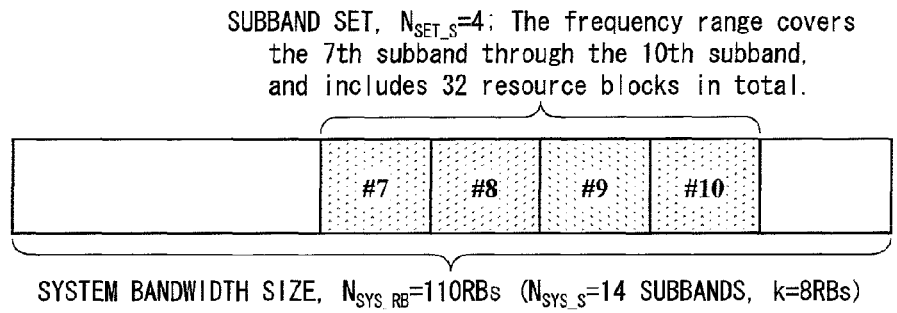
FIG. 17 is a diagram schematically illustrating how the base station assigns a subband set within the system bandwidth.
Figure 18:
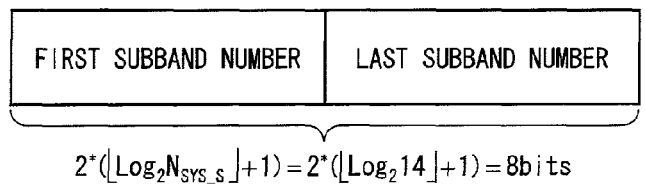
FIG. 18 is a diagram schematically illustrating how the base station directly notifies UE of the respective subband numbers of the first and last subbands in a subband set.
Figure 19:
FIG. 19 is a diagram schematically illustrating how the base station notifies UE of information about the respective subband numbers of the first and last subbands in a subband set by a method using a number of combinations.

(3) The subband set assignment unit 14 of the base station selects some subbands so as to form a subband set and thus assign the subband set to UE. The system bandwidth includes 110 resource blocks, and k is 8. The subband set formed from the selected subbands includes $N_{SET\_S}=4$ subbands. The individual subbands #7 through #10 in the subband set are located continuously on a frequency spectrum and together include 32 resource blocks (see FIG. 17). The base station notifies the UE of information about the subband set, such as information about the respective subband numbers, within the system bandwidth, of first and last subbands in the subband set. The notification can be carried out by a method of directly notifying the respective subband numbers, within the system bandwidth, of the first and last subbands in the subband set. The first and last subband numbers can be indicated, for example, with 8-bit data as illustrated in FIG. 18. Alternatively, the base station can notify the UE of the index number of a combination in accordance with a method based on a number of combinations. Specifically, assuming that the system bandwidth includes a total of $N_{SYS\_S}$ of subbands, the index number of a combination falls within a range from 1 to $C(N_{SYS\_S}, 2)$, e.g., #Q. The index number of a combination is indicated with 7-bit data as illustrated in FIG. 19. The UE identifies, on the basis of the index number of a combination, respective locations of the first and last subbands in the subband set assigned to the UE.

Figure 20:
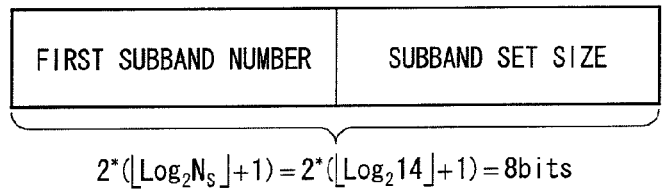
FIG. 20 is a diagram schematically illustrating how the base station notifies UE of information about a subband set by a method of notifying information about (i) the first subband in the subband set and (ii) the length of the subband set.

Alternatively, the base station notifies the UE of information about the subband set by notifying (i) the subband number, within the system bandwidth, of the first subband in the subband set and (ii) a length of the subband set (i.e., a number of subbands included in the subband set). A combination of the subband number and the length of the subband set is indicated, for example, with 8-bit data as illustrated in FIG. 20.

(4) After receiving the information about the subband set assigned by the base station, the UE, with reference to a Table 6, obtains (i) a subband size k' for the subband set and (ii) a corresponding number J of bandwidth parts on the basis of a subband set size $N_{SET\_RB}$ (i.e., a number of resource blocks included in the subband set). Refer to Table 6 below for a specific method of how the UE obtains the subband size k' and the number J. According to the present application example, the subband set assigned to the UE includes 32 resource blocks. According to Table 6, a corresponding subband size k' is 6, and a corresponding number J of bandwidth parts is 3. The UE needs to (i) select a single subband from each of the 3 bandwidth parts and (ii) feed back information about the subbands thus selected to the base station.

TABLE 6

| SUBBAND SET SIZE $N_{SET\_RB}(RB_S)$ | SUBBAND SET SIZE k'($RB_S$) | NUMBER J OF BANDWIDTH PARTS |
|---|---|---|
| 6-7 | BROADBAND ONLY | 1 |
| 8-10 | 4 | 1 |
| 11-26 | 4 | 2 |
| 27-63 | 6 | 3 |
| 64-110 | 8 | 4 |

Figure 21:
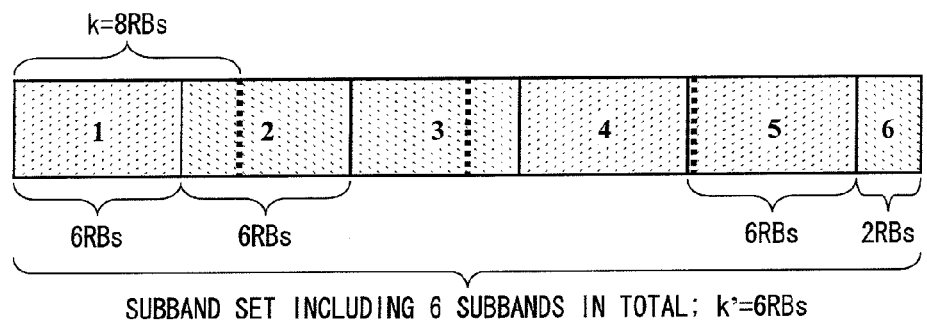
FIG. 21 is a diagram schematically illustrating how UE re-divides a subband set into subbands on the basis of the size of the subband set.
Figure 22:
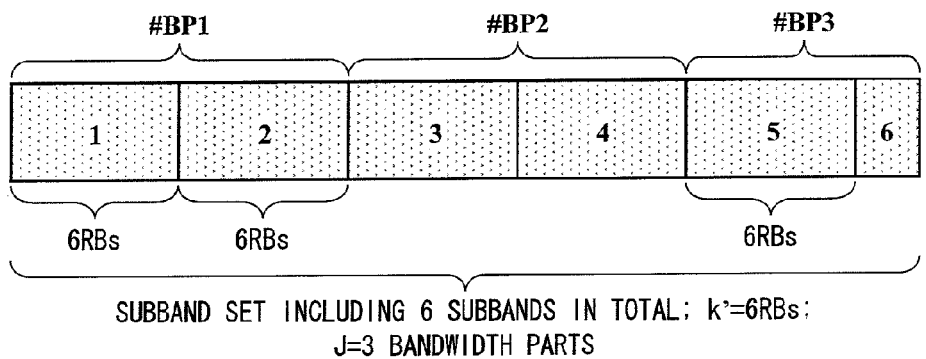
FIG. 22 is a diagram schematically illustrating how the UE further divides the subband set into bandwidth parts on the basis of the subbands resulting from the above re-division.

(5) The subband re-division unit 21 of the UE re-divides the subband set into individual subbands on the basis of, for example, k'. As illustrated in FIG. 21, the subband set is divided into 6 subbands. Resource blocks included in each subband are located continuously on a frequency spectrum, and the individual subbands are located continuously on a frequency spectrum in order of their respective numbers. In a case where a number $P_{RB}'$ of resource blocks included in the subband set is not an integral multiple of k', the last subband within the frequency spectrum part is set to the i'-th subband (where k' is either an integer equal to $P_{RB}'/k'$ or a smallest one of integers greater than $P_{RB}'/k'$). This allows the last subband to include resource blocks fewer than k'. The subband re-division unit 21 of the UE forms 3 bandwidth parts from the subbands resulting from the above division (see FIG. 22). The subband information feedback unit 22 of the UE (i) selects a subband from each of the 3 bandwidth parts and (ii) feeds back information about the 3 selected subbands, such as a rank, PMI, and CQI of each of the 3 selected subbands, to the base station.

(6) The resource scheduling/transmitter optimization unit 15 of the base station carries out resource scheduling and optimization of a transmitter on the basis of the information thus fed back.

The resource scheduling/transmitter optimization unit 15 of the base station obtains, on the basis of the feedback information for the subband set assigned to the UE, (i) the size of the subbands whose information has been fed back from the UE and (ii) a number of the subbands, by a method which has been agreed upon with the UE in advance and which is thus common to the base station and the UE. The size and the number are obtained, for example, as indicated in Table 6, stored in the memory device (not shown) of the UE. The resource scheduling/transmitter optimization unit 15 then transmitter on the basis of the information fed back from the UE.

(7) Steps (1) through (6) are repeatedly carried out.

It is thus possible to maintain a smooth communication between the base station and each UE in the wireless cell by repeatedly carrying out the steps (1) through (6) as illustrated in FIG. 3.

Application Example 6

(1) Configuration of a Wireless Cell

As illustrated in FIG. 1, a wireless cell includes a single base station (eNodeB) and plural pieces of user equipment (UE). FIGS. 2A through 2C illustrate the principle of how information is fed back within the wireless cell.

(2) The subband division unit 14 of the base station obtains a subband size k (i.e., a number of resource blocks included in each subband) on the basis of a system bandwidth size $N_{SYS\_RB}$ (i.e., a number of resource blocks included in the system bandwidth). Refer to Table 5, stored in a memory device (not shown) of the base station, for a specific method of how the base station divides the system bandwidth into subbands.

Resource blocks in each subband are located continuously on a frequency spectrum, and the individual subbands are located continuously on a frequency spectrum in order of their respective numbers. In a case where a number $P_{RB}$ of resource blocks included in a continuous frequency spectrum part within the system bandwidth is not an integral multiple of k, the last subband within the continuous frequency spectrum part is set to an i-th subband (where i is either an integer equal to $P_{RB}/k$ or a smallest one of integers greater than $P_{RB}/k$). This allows the last subband to include resource blocks fewer than k.

Figure 11:
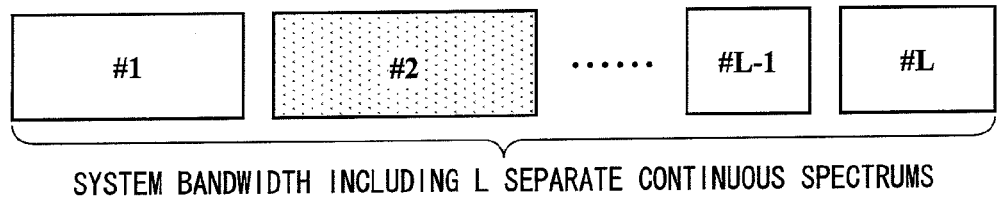
FIG. 11 is a diagram schematically illustrating how the base station assigns a separate continuous spectrum to UE as a subband set in a case where the system bandwidth is discontinuous on a frequency spectrum.

(3) The subband set assignment unit 14 of the base station selects some subbands so as to form a subband set. In a case where, for example, the system bandwidth is discontinuous on a frequency spectrum, the system bandwidth is divided into an L-number of parts (see FIG. 11), and the base station assigns a separate frequency spectrum part to UE as a subband set for each subband set assignment. The base station notifies the UE of information about the subband set. The notification can be carried out by a method of directly notifying the respective subband numbers, within the system bandwidth, of first and last subbands in the subband set. An example is illustrated in each of FIGS. 18 and 19. The UE can identify respective locations of the first and last subbands in the subband set on the basis of the information about the subband numbers. Alternatively, the base station notifies the UE of information about the subband set by notifying (i) the subband number, within the system bandwidth, of the first subband in the subband set and (ii) a length of the subband set (i.e., a number of subbands included in the subband set). An example is illustrated in FIG. 20.

According to the present application example, in a case where the base station assigns a separate continuous spectrum part within the system bandwidth to UE as a subband set, the base station can notify the UE of information about the subband set by directly notifying the UE of a number of the parts of the separate frequency spectrum. The UE obtains information about the assigned subband set by receiving information about the number of the parts of the separate frequency spectrum. The number can be indicated with data having a number of bits which number is obtained by adding 1 to the integer part of $\log_2 L$ (see FIG. 12).

(4) After receiving the information about the subband set assigned by the base station, the UE obtains, with reference to Table 3 stored in a memory device (not shown) of the UE, (i) a subband size k' for the subband set and (ii) a corresponding number J of bandwidth parts on the basis of a subband set size $N_{SET\_RB}$ (i.e., a number of resource blocks included in the subband set). Refer to Table 3 below for a specific method of how the UE obtains the subband size k' and the number J.

(5) The subband re-division unit 21 of the UE re-divides the subband set into individual subbands on the basis of, for example, k'. Resource blocks in each subband are located continuously on a frequency spectrum, and the individual subbands are located continuously on a frequency spectrum in order of their respective numbers. In a case where a number $P_{RB}'$ of resource blocks included in the subband set is not an integral multiple of k', the last subband within the frequency spectrum part is set to the i'-th subband (where i' is either an integer equal to $P_{RB}'/k'$ or a smallest one of integers greater than $P_{RB}'/k'$). This allows the last subband to include resource blocks fewer than k'. The subband re-division unit 21 of the UE forms J bandwidth parts from the subbands resulting from the above division (see FIG. 22). The subband information feedback unit 22 of the UE (i) selects a subband from each of the J bandwidth parts and (ii) feeds back information about the 3 selected subbands, such as a rank, PMI, and CQI of each of the selected subbands, to the base station.

(6) The resource scheduling/transmitter optimization unit 15 of the base station carries out resource scheduling and optimization of the transmitter on the basis of the information thus fed back.

The resource scheduling/transmitter optimization unit 15 of the base station obtains, on the basis of the feedback information for the subband set assigned to the UE, (i) the size of the subbands whose information has been fed back from the UE and (ii) a number of the subbands, by a method which has been agreed upon with the UE in advance and which is thus common to the base station and the UE. The size and the number are obtained, for example, as indicated in Table 3. The resource scheduling/transmitter optimization unit 15 then carries out resource scheduling and optimization of the transmitter on the basis of the information fed back from the UE.

(7) Steps (1) through (6) are repeatedly carried out.

It is thus possible to maintain a smooth communication between the base station and each UE in the wireless cell by repeatedly carrying out the steps (1) through (6) as illustrated in FIG. 3.

Finally, each of (i) the base station and (ii) the blocks of the user equipment (UE), particularly the transmitter 10 and the receiver 20, may be realized by way of hardware or software as executed by a CPU as follows.

The base station and the UE each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to each of the base station and the UE a computer-readable storage medium containing control program code (executable program, intermediate code program, or source program) for each of the base station and the UE, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (registered trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The base station and the UE may each be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention can be achieved by use of a computer data signal embodied in a carrier wave which signal is formed by electronic transmission of the program code.

INDUSTRIAL APPLICABILITY

As described above, the embodiment of the present invention provides (i) a self-adapting determining method for determining the size and number of subbands, (ii) a base station, (iii) user equipment, and (iv) a communications system, each of which is used in information feedback. Specifically, the size and number of subbands for use in information feedback are dynamically changed on the basis of the size of a subband set assign by the base station. This makes it possible to reduce the amount of feedback information and improve feedback precision, and consequently to improve performance of the entire system with sufficient use of a selectivity characteristic of a channel. Hence, the determining method, base station, user equipment, and communications system of the embodiment of the present invention are suitable for various applications. The embodiment of the present invention thus provides significant theoretical support and a specific implementation method for a closed-loop feedback determining method, base station, user equipment, and communications system for a system such as cellular mobile communication of 3rd generation (3G), super 3rd generation (S3G), or 4th generation (4G) and a digital television, a wireless LAN (WLAN), a self-organized network (MeSh, Ad Hoc, CenSor Network), a digital home network (e-Home), and a wireless wide area network (WWAN).

| Reference Signs List | |
| --- | --- |
| 10 | Transmitter |
| 11A through 11D | OFDM mapping unit |
| 12A through 12D | OFDM signal generation unit |
| 13 | Subband division unit |
| 14 | Subband set assignment unit |
| 15 | Resource scheduling/transmitter optimization unit |
| 20 | Receiver |
| 23A through 23D | Demodulation unit |
| 24A through 24D | Channel decoding unit |
| 21 | Subband re-division unit |
| 22 | Subband information feedback unit |

The invention claimed is:

1. A communication system comprising a base station and a piece of user equipment communicating with the base station,
the base station dividing a system bandwidth into a plurality of subbands, selecting at least two subbands from among the plurality of subbands to form a subband set, and transmitting to the piece of user equipment information about a frequency band of the subband set which frequency band is made up of a collection of a plurality of respective frequency bands of the at least two subbands selected,
the piece of user equipment determining, on a basis of the information about the frequency band of the subband set, a number of subbands to be selected from among the at least two subbands forming the frequency band of the subband set, selecting the determined number of subbands, and transmitting, to the base station, feedback information about the subbands selected.

2. The communication system according to claim 1, wherein:
the piece of user equipment determines a subband size on a basis of the information about the frequency band of the subband set and re-divides the frequency band of the subband set into subbands each having the subband size determined.

3. The communication system according to claim 1, wherein:
the feedback information indicates a channel quality of a downlink within the frequency band of the subband set.

4. A piece of user equipment for communicating with a base station, comprising:
means for receiving, from the base station, information about a frequency band of a subband set, which the base station forms by dividing a system bandwidth into a plurality of subbands and selecting at least two first subbands from among the plurality of subbands, the frequency band being made up of a collection of a plurality of respective frequency bands of the at least two subbands selected;
means for determining, on a basis of the information about the frequency band of the subband set, a number of subbands to be selected from among the at least two subbands forming the frequency band of the subband set;
means for selecting the determined number of subbands; and
means for transmitting, to the base station, feedback information about the subbands selected.

5. The piece of user equipment according to claim 4, further comprising:
means for determining a subband size on a basis of the information about the frequency band of the subband set; and
means for re-dividing the frequency band of the subband set into subbands each having the subband size determined.

6. The piece of user equipment according to claim 4, wherein:
the feedback information indicates a channel quality of a downlink within the frequency band of the subband set.

7. A communication method for use in a piece of user equipment communicating with a base station, the method comprising the steps of:
receiving, from the base station, information about a frequency band of a subband set, which the base station forms by dividing a system bandwidth into a plurality of subbands and selecting at least two first subbands from among the plurality of subbands, the frequency band being made up of a collection of a plurality of respective frequency bands of the at least two subbands selected;
determining, on a basis of the information about the frequency band of the subband set, a number of subbands to be selected from among the at least two subbands forming the frequency band of the subband set;
selecting the determined number of subbands; and
transmitting, to the base station, feedback information about the subbands selected.

8. The communication method according to claim 7, further comprising the steps of:
determining a subband size on a basis of the information about the frequency band of the subband set; and
re-dividing the frequency band of the subband set into subbands each having the subband size determined.

9. The communication method according to claim 7, wherein:
the feedback information indicates a channel quality of a downlink within the frequency band of the subband set.

* * * * *